(12) United States Patent
Mukaida et al.

(10) Patent No.: US 7,840,541 B2
(45) Date of Patent: Nov. 23, 2010

(54) INFORMATION RECORDING METHOD AND INFORMATION RECORDING/REPRODUCTION DEVICE

(75) Inventors: Hideaki Mukaida, Daito (JP); Katsuyoshi Oki, Daito (JP); Akira Imanaga, Daito (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 256 days.

(21) Appl. No.: 10/594,973

(22) PCT Filed: Mar. 31, 2005

(86) PCT No.: PCT/JP2005/006366

§ 371 (c)(1),
(2), (4) Date: Sep. 29, 2006

(87) PCT Pub. No.: WO2005/096154

PCT Pub. Date: Oct. 13, 2005

(65) Prior Publication Data

US 2007/0274176 A1   Nov. 29, 2007

(30) Foreign Application Priority Data

Mar. 31, 2004  (JP) .............................. 2004-105011
Mar. 31, 2004  (JP) .............................. 2004-105012
Mar. 31, 2004  (JP) .............................. 2004-105013

(51) Int. Cl.
*G06F 17/30* (2006.01)
(52) U.S. Cl. ...................................... 707/694; 707/640
(58) Field of Classification Search ........................ None
See application file for complete search history.

(56) References Cited

U.S. PATENT DOCUMENTS 6,922,759 B1 * 7/2005 Garritsen ..................... 711/154
6,952,522 B2 * 10/2005 Takahashi et al. ............. 386/65

(Continued)

FOREIGN PATENT DOCUMENTS

EP        1 172 817 A2      1/2002

(Continued)

OTHER PUBLICATIONS

Notification of Transmittal of Translation of the International Preliminary Report on Patentability (Form PCT/IB/338) of International Application No. PCT/JP2005/006366 mailed Oct. 26, 2006 with Forms PCT/IB/373 and PCT/ISA/237.

*Primary Examiner*—Baoquoc N To
(74) *Attorney, Agent, or Firm*—Westerman, Hattori, Daniels & Adrian, LLP

(57) ABSTRACT

This invention has for its object to eliminate failure of correct recording on a recording medium in an on-vehicle audio recording/reproduction device due to an instantaneous power cut-off or the like. In order to achieve this object, a file system is used for managing files hierarchically by using files having information and a directory as a storage place of a plurality of files so that predetermined information is recorded in a work sector for backup before performing the primary recording. The work sector is selected from a work sector area having a plurality of sectors and the work sector has recorded the number of mountings of the file system. Thus, an optimal work sector is used for data recovery.

9 Claims, 12 Drawing Sheets

U.S. PATENT DOCUMENTS

| | | |
|---|---|---|
| 7,447,672 B2 * | 11/2008 | Suzuki et al. .................. 707/1 |
| 2003/0193859 A1 | 10/2003 | Mitsuda et al. |
| 2004/0064629 A1 | 4/2004 | Kaku |
| 2007/0043900 A1 * | 2/2007 | Yun ........................... 711/103 |

FOREIGN PATENT DOCUMENTS

| | | |
|---|---|---|
| EP | 1 517 229 A1 | 3/2005 |
| JP | 60-229149 A | 11/1985 |
| JP | 1-119839 A | 5/1989 |
| JP | 4-145596 A | 5/1992 |
| JP | 6-229149 A | 8/1994 |
| JP | 7-210438 A | 8/1995 |
| JP | 2002-41336 A | 8/2002 |
| JP | 2004-78461 A | 3/2004 |
| WO | WO 02/056178 A | 7/2002 |
| WO | WO 2004/003723 A | 1/2004 |

* cited by examiner

| FLAG (E, C, F) | PATH NAME OF FILE UNDER FORMATION | DATA ITEM |
|---|---|---|

INFORMATION RECORDING METHOD AND INFORMATION RECORDING/REPRODUCTION DEVICE

TECHNICAL FIELD

This invention relates to a method and a device for recording/reproducing information, and more particularly relates to a method and a device for recording/reproducing audio signals on recording media such as a hard disk and the like.

BACKGROUND ART

Audio signal recording/reproduction devices using techniques to compress audio signals as information have been in practical use, and semiconductor memories and hard disks are used as recording media thereof. In addition, on-vehicle audio signal recording/reproduction devices using hard disks as recording media have recently been in practical use.

When using hard disks as recording media, the FAT (File Allocation Table) is often used as a file system because of its easy implementation (for example, see Japanese Unexamined Patent Publication No. 2002-41336. Regarding the FAT system, see a special topic of the magazine *Interface*, July 2001, for example).

SUMMARY OF INVENTIONS

Problems to Solve

On-vehicle audio signal recording/reproduction devices using hard disks as recording media have inherent difficulties due to their special application of being used in vehicles.

In other words, on-vehicle devices are required to cope with such difficulties as vibration and an instantaneous power cut-off which are different from difficulties for audio signal recording/reproduction devices for interior use. Particularly when using hard disks, problems arise that vibration or unstable supply voltage destabilizes recording/reproduction operations, so that recording/reproduction is not performed reliably. This is because a head in a hard disk drive device is so structured that it is retracted and stops recording/reproducing if vibration is strong.

Specific problems for audio signal recording/reproduction devices using hard disks will be described.

The FAT, which is widely used in personal computers, is often used for recording a data file itself. Although low level access can be realized per sector when accessing to a hard disk, management per cluster only is possible on the FAT file system. One cluster normally consists of a plurality of sectors. In the system now under consideration, one cluster consists of 32 sectors.

Detailed description of the FAT file system itself will be omitted, since it is well known. A series of sector numbers on a hard disk, in which file entities are recorded, are recorded on an area called the File Allocation Table (FAT) on the disk to be used for accessing to the files. In addition, files are managed hierarchically by use of storage places of the files called directories. Information on a directory includes information on files managed under the name of the directory. If the information is destroyed, a problem arises that the files can not be accessed even if there is no problem in actual files. The information on the directory is updated in connection with file recordings. Therefore, if phenomena like vibration, an instantaneous power cut-off or the like occur while updating, sometimes information inconsistency between actual files and the directory occurs or the files can not be accessed.

The FAT file system itself is a file system used from long ago whose function has been enhanced in connection with the development of personal computers. In the old version of the FAT file system, information on the root directory was fixedly recorded in an area immediately following the FAT. In the recent FAT 32 file system, however, all directory information can be allocated to any location of the data area, and in any size.

Here, directory information is managed in the same way as a file on the FAT file system. One directory needs at least one cluster area regardless of the number of files included in the directory. As described above, one cluster corresponds to 32 sectors in the system now under consideration.

Accordingly, if a backup is made before directory information is updated (rewritten), it is possible to recover from the backup in case the update fails due to an instantaneous power cut-off or the like while updating. One of such ways is holding sector addresses and contents to be rewritten in a boot sector of the FAT file system.

On the other hand, measures are needed against improper writing/reading, caused by a part of the boot sector (a work sector) becoming a bad sector. Regarding this, an area comprising a plurality of sectors can be allocated as a work sector area in the boot sector. Writable/readable sectors in the work sector area can be used sequentially as work sectors, for example, from a lower address.

In an on-vehicle application involving strong vibration, however, sometimes writing/reading can not be performed even when sectors are not bad. In such cases, it may be possible that other work sectors are used to recover data with old contents.

This invention is made in consideration of the above-described situations, and it has for its object to solve problems such as failure of correct recording on a recording medium in an on-vehicle audio recording/reproduction device due to an instantaneous power cut-off or the like.

Means to Solve Problem

This invention is a file system which manages files hierarchically by files having information and a directory which is a storage place of a plurality of files, and is an information recording method or device by using a file system which writes in and reads from a recording medium per predetermined unit, wherein predetermined information is first recorded in a work sector for backup before performing a primary recording, and the number of mountings of the file system is further recorded in the work sector.

The above-described structure, for example, enables original information to be recovered on the basis of information recorded in the work sector, even if the process is halted due to power cut-off or the like when recording main information and database files about this main information on recording media such as hard disks. Further, information about the number of mountings is also recorded in the work sector, preventing information from being recovered from an incorrect work sector.

Moreover, the work sector consists of two sectors. The number of mountings is recorded in the first sector, and information contents to be recorded are recorded in the second sector.

Furthermore, the work sector for backup is located in a work sector area having a plurality of sectors, and the work sector is determined when the file system is mounted.

Additionally, according to this invention, the predetermined information is information about directories.

Further, the file system is the FAT file system in this invention.

This invention is a file system which manages files hierarchically by files having information and a directory which is a storage place of a plurality of files, and is an information recording and/or reproduction method/device by files having information and a directory which is a storage place of a plurality of files, wherein a file system which writes in and reads from a recording medium per predetermined unit is used, information about the directory is separated by a predetermined offset, and a plurality of the information are written in the predetermined unit.

According to this invention, the method for recording information about the directory is redundant. Specifically, one cluster in which information about the directory is recorded is divided into two, and the same information about the directory is recorded in the front and back halves thereof.

According to the above-described structure, information about the directory is doubly recorded. Therefore, even when information in one half cannot be read, information about the directory is reliably read by using information in the other half. Consequently, the information about the directory can be properly written in and read from sectors for backup even when a sector on a hard disk cannot be read, thereby being optimally used for a device recording and/or reproducing information signals such as audio signals.

Moreover, this invention is an information recording and/or reproduction device comprising files and directories which employs the FAT file system, in which files for recording information are managed hierarchically as well as recording and/or reproducing information is performed per cluster consisting of predetermined sectors, and this invention comprises a designating means for designating a sector in which information to be recorded is written, a judging means for judging whether the information to be recorded is information about directory, a directory information recording means for writing the information about the directory in both sectors designated by the designating means and located at the predetermined offset from the designated sector when the judgment result by the judging means is information about the directory.

Additionally, this invention is an information recording and/or reproduction device, characterized in that information about the directory is first written in a sector located at the predetermined offset from the designated sector.

Furthermore, the offset can be characterized by half size of one cluster.

This invention is a method/device of recording and/or reproducing information, wherein main information is recorded as a file and a database file about this main information is updated, and this invention is a method/device of recording and/or reproducing information, wherein update of the database file is performed by updating a main database file, update of a database file for backup is performed after completion of updating the main database file, and a flag in the file to indicate updating condition is further set to be in a condition of indicating being updated while each of the database file is being updated.

According to this invention, database files for backup are used besides the master (main) database file, and a necessary process is performed upon checking updating conditions of respective database files by using flags to indicate updating conditions included in the database files.

The above-described structure makes it possible to prevent inconsistency between main information and a database, even when a process is halted due to power cut-off or the like while recording the main information and the database file regarding this main information on recording media such as hard disks.

Moreover, according to this invention, the database file for backup consists of a first backup file and a second backup file, and the second backup file is updated after completion of updating the first backup file.

Additionally, according to this invention, a flag in the file to indicate updating condition further has a condition to indicate update completion, and a flag to indicate updating condition of a database file whose update is completed is set to be in the condition of update completion.

Furthermore, according to this invention, flags to indicate updating conditions of a main database file, first and second database files for backup are checked during system start-up, and a recovery process of a database file is performed based on a database file whose update is completed, when not all of the flags to indicate updating conditions indicate update completion.

According to this invention, the main database file, the first and the second database files for backup further include file identifying information to identify a main information file, and a predetermined process is performed based on the file identifying information during system start-up.

BEST MODE FOR CARRYING OUT INVENTION

Hereinafter, embodiments of this invention will be described with reference to drawings.

FIG. 1 is a schematic block diagram illustrating a structure of an on-vehicle audio signal recording/reproduction device for which this invention is used. The present embodiment is an on-vehicle audio signal recording/reproduction device 1000, which is separated into a main unit 1 and a digital processing unit 2. The main unit 1 is equivalent to a conventional on-vehicle system, and comprises an antenna 3, a tuner 4, a host microcomputer 5, a sub microcomputer 6, an electronic volume 7, a power amplifier 8, a speaker 9, a liquid crystal display (LCD) 10 for display, an LCD driver 11, a DC fan 12 for cooling, a DC fan controller 13, an operation switch 14, and a remote control receiver 15. Detailed description of the main unit 1 will be omitted.

The digital processing unit 2 is provided with a hard disk 21 and a CD-ROM drive 22 as recording or reproducing media. A DSP (Digital Signal Processor) 24 is connected with the hard disk 21, the CD-ROM drive 22, an SD-RAM (Synchronous DRAM) 26 and a flash memory 27 through an IDE (Integrated Drive Electronics) bus 25. Audio output from the DSP 24 is supplied to the electronic volume controller 7 through a DAC (Digital Analog Converter) 29, and is amplified by the power amplifier 8, so that the audio output is eventually released from the speaker 9.

The DSP 24 performs decoding/encoding of audio signals. More specifically, for example, audio CDs mounted on the CD-ROM drive 22 are reproduced, and their CD-DA formatted signals are supplied to the DSP 24 through the IDE bus 25. The DSP 24 performs MP3 (MPEG Audio Layer-3) encoding of the CD-DA formatted signals in real-time. The DSP 24 records the MP3 signals given to the hard disk 21 from the IDE bus 25 as digital signals. Also, the DSP 24 decodes the MP3 digital signals read out from the hard disk 21 and supplies them to the DAC 29 as digital audio signals. The SD-RAM 26 and the flash memory 27 store programs and data necessary for this encoding/decoding, or they are used as a working area.

The digital processing unit 2 is controlled by the main unit 1 by use of command communication through a UART (Universal Asynchronous Receiver-Transceiver) bus 30 connecting both units.

FIG. 2 is a flowchart illustrating an outline of the digital processing unit 2 from system start-up to the system end focusing on a recording process of audio signals. When power is supplied to the digital processing unit 2 and the system starts, a mounting process and a checking process of a hard disk are performed in Step 31. Here, a mounting process and an error checking process of the hard disk 21 are performed. Next, a checking process for a database (DB) of audio data is performed (Step 32). After the DB checking process in Step 32, a recording process is performed in Step 33. The process goes to Step S34, in which a database updating process is performed every time a tune is recorded. Next in Step S35, whether the audio recording operation will end or not is judged. If the audio recording operation will not end, the process goes back to Step 33 to repeat the aforementioned operation. If the system is judged to have ended in Step 35, the process goes to Step S36 to perform an ending process, after which the system ends.

The above description was made on condition that the FAT is used as the file system. As described above, the FAT system is a file system widely used in personal computers, about which many articles are written, and accordingly, its detailed description will be omitted. A hard disk is divided as shown in FIG. 3. There is a boot sector 100 firstly, an FAT area 101 next, then a route directory area 102 and predominantly a data area 104. Recorded on the boot sector 100 are a booting (IPL: Initial Program Loader) for loading an OS (Operating System) and information for managing a hard disk (information on beginning sectors of the FAT area, the directory area and the data area as well as their capacities). In addition to these, the boot sector 100 is used as a backup area when updating directories in this embodiment. The boot sector 100 in this embodiment is also used as work sectors.

Work sectors should preferably be recorded out of the file system's control. Accordingly, the work sectors are recorded in the boot sector in this embodiment. If the work sectors are recorded in an area controlled by the file system, the work sectors are to be accessed through the file system. In this case, the work sectors can not be accessed if something wrong happens to the file system, which is a problem. Therefore, the work sectors should preferably be recorded outside the file system. Recording work sectors in a predetermined location on the disk makes the work sectors directly and easily accessible, which is convenient.

The FAT comprises FAT entries, the number of which respectively corresponds to a plurality of clusters consisting of divided data areas. When a file is recorded in corresponding clusters, written on each FAT entry is the number of next cluster in which the file is further recorded (the FAT entry number to trace next is also indicated), or a value to indicate the last cluster in which the file is recorded.

Additionally, a value to indicate that the corresponding clusters are not in use and are available, a value to indicate that the corresponding clusters are bad clusters (including unreadable, unwritable sectors due to flaws) or the like is written on each FAT entry.

Since one cluster is a minimum management unit in the FAT system, a directory consumes at least 1 cluster (32 sectors in this embodiment). This leads to wasted disk space in the present system in which the number of files storable in one directory is limited. Therefore, a structure for effectively using clusters in which directory entries are recorded is suggested as will be described later.

Next, the mount checking process (Step 31) will be described as referring to FIGS. 4 to 6. The mounting process of the hard disk 21 is a process to enable the digital processing unit 2 to use the file system in the hard disk 21.

When mounting the hard disk, work sectors are checked first. In this embodiment, work sectors are provided in the area from the 8th sector to the 61st sector of the boot sector in FIG. 3. Two sectors are used as a pair. Therefore, there are 27 sets of work sectors, and the work sectors actually used in the system are called effective work sectors. In the former sector of one pair (corresponding to an effective work sector among sectors W having even numbers beginning from 8), the number of mountings of the file system, the effective work sector number, the directory address and the checksum are recorded. In the latter sector of one pair (corresponding to an effective work sector among sectors W+1 having odd numbers beginning from 9), the same data as the sector of the directory entry being updated is recorded. When the update is completed without any problems, however, contents of the sector W+1 are cleared. Therefore, if the contents of the effective work sector W+1 are cleared, it can be judged that the update process of the directory entry is completed without any problems.

Now, the checking process during mounting is described as referring to FIG. 4. First, the initial setting is performed, and the LBA (Logical Block Address), the current work sector number and the maximum number of mountings are respectively set to 8, 0 and 0 (Step 38). The process proceeds to Step 39, and whether the LBA is 61 or larger is judged in Step 39. The process proceeds to Step S40, since the LBA is 8 in the first routine. In Step 40, the number of mountings and the effective work sector number are read in, and the process proceeds to Step 41 in which read error is judged. If there is a read error, the process proceeds to Step 44. If they are normally read in, the process proceeds to Step 42, in which whether the number of mountings is smaller than the maximum number of mountings is judged. If smaller, the process proceeds to Step 44 in which the LBA is incremented by two, and the process goes back to Step 39 to repeat the aforementioned operation. When the number of mountings is judged to reach the maximum number of mountings in Step 42, the number of mountings is set to the maximum number of mountings and the current work sector number is set to the work number in Step 43. Thereafter, the process goes back to Step 39 through Step 44. When the LBA becomes 61 in Step 39, the process proceeds to (1) in FIG. 5 (Step 46).

In the aforementioned process, data of the number of mountings and the effective work sector number are repeatedly read in from sectors having even numbers within the area with LBA (Logical Block Addresses) of sectors from 8 to 61. With the process from Step 39 to (1) in FIG. 5 (Step 46), the number of accumulated mountings in previous mounting (the maximum number of mountings recorded in the work sector) and the effective current work sector number in previous mounting are held respectively in variables "maximum number of mountings" and "current work sector number".

In Step 46 in FIG. 5, whether the effective current work sector number is 0 (zero) or not is checked. If not zero, the process proceeds to Step 47 in which the sector at the location of the current work sector is read in. The process proceeds to Step 48 in which a read error is checked, and if there is a read error, the process proceeds to Step 56 of (2) in FIG. 6. If there is no error, the process proceeds to Step 49 in which the current work sector is incremented by one, so that the sector at that location is read in. The process proceeds to Step 50. Whether there is a read error or not is checked in Step 50. If there is any error, the process proceeds to (2) in FIG. 6 (Step 56). If there is no error, the process proceeds to Step 51 in which checksum is checked. In the steps from Step 47 to Step 51, data is read in from the effective current work sector W and the subsequent work sector W+1, and the checksum is checked when there is no reading error respectively, thereby checking whether the work sector W+1 subsequent to the current work sector is cleared or not. If cleared, the process proceeds to Step 56 of (2) in FIG. 6. If not cleared, a problem is judged to have occurred while updating the directory entry during system start-up, so that the process from Step 52 to Step 54 is performed. Namely in Step S52, the contents of the sector W+1 are written in the sector indicated by the address of the directory entry recorded in the effective current work sector. Further in Step 53, the same contents are written in the sector at the location +16 distant. In Step 54, the contents of the sector W+1 are cleared. Then, the process proceeds to Step 56 of (2) in FIG. 6. Since one cluster consists of 32 sectors in this embodiment, the offset is separated by 16 sectors, namely half of one cluster.

The process beginning from Step 56 of FIG. 6 is a preprocessing for checking during mounting this time. First, variables are initialized by performing the initial processing operation in Step 56. In other words, the LBA and the current work sector are set to 8 and 0 respectively, and the maximum number of mountings is incremented by +1. The process proceeds to Step 57. In Step 57, whether the variable "maximum number of mountings" is larger than the 32-bit binary code 0xFFFFFFFF or not is judged. When it becomes larger than the 32-bit binary code 0xFFFFFFFF as a result of the variable "maximum number of mountings" being incremented by +1, the process proceeds to Step 58 in which 1 is substituted as the maximum number of mountings. When the variable "maximum number of mountings" is not larger than the 32-bit binary code 0xFFFFFFFF, the process proceeds to Step 59.

The process loop from Step 59 to Step 64 is for selecting sets which are sequentially readable and writable pairs of work sectors having even numbers and subsequent work sectors. In other words, whether the LBA is 61 or larger is checked in Step 59. If the LBA is 61 or larger, mount error is judged to have occurred. If the LBA is smaller than 61, the process proceeds to Step 60 in which the sector (LBA +1) subsequent to the sector LBA is cleared. The process proceeds to Step 61. Subsequently, whether there is a writing error or not is judged in Step 61. If there is no writing error in Step 61, the process proceeds to Step 62 in which "the maximum number of mountings" and "the current work sector number" are written in the work sector indicated by the LBA. Then, the process proceeds to Step 63.

If a writing error is judged to have occurred in Step 61, the process proceeds to Step 64 in which the LBA is incremented by +2. The process goes back to Step 59 to repeat the foregoing operation.

After writing "the maximum number of mountings" and "the current work sector number" in the work sector indicated by the LBA, the process proceeds to Step 63. If there is no writing error in Step 63, there is no error in the consecutive sectors. Therefore, the process falls out of the loop and proceeds to Step 65 in order to use the sector LBA and the sector LBA +1 as effective current work sectors. If a writing error occurs in either of the writings, the next pair will be checked through Step 64.

In Steps 65, 67, 68, 70 and 71, the process loop is implemented in which the updated "maximum number of mountings" and effective current work sector numbers are recorded in sectors with even numbers (except effective current work sectors) within the remaining work sector area.

A current work sector is set to the LBA, and the LBA is set to 8 in Step 65. The process proceeds to Step 67. In Step 67, the end of the loop, namely whether the LBA is 61 or larger or not is judged. If it is 61 or larger, the end of the loop is detected and the process proceeds to Step 66.

If the LBA is smaller than 61, the process proceeds to Step 70 in which whether the LBA is a current sector or not is judged. If it is the current sector, the process proceeds to Step 68 in which the LBA is incremented by +2. The process goes back to Step 67. If the LBA is not the current sector in Step 70, the maximum number of mountings and the current work are written in the location of the LBA. The process proceeds to Step 68.

When the end of the loop is detected in Step 67, the file system mounting process is performed in Step 66. The process proceeds to Step 72. Whether a mount error has occurred or not is judged in Step 72. If the mount error has not occurred, mounting is completed. When the mount error has occurred, the process ends as a mount error.

The aforementioned DB checking process in Step 35 is for checking a database of audio signal data (specifically, tunes). Before this checking process, the database used in the present system will be briefly described. The database is for managing tunes on a hard disk. For example, the database keeps information like the numerical order of albums, numbers of tracks, chain of album names before and after the present album and so on. Further, such information is kept about data of all tunes recorded on the hard disk. Such data, for example, is automatically formed and registered in the database when including data of an audio CD. The database includes the items of {Album No., Number of tracks (Number of tracks in the present album), Album numbers of before and after the present album, Album title, Artist and Category}.

When transferred from an audio CD, data is automatically generated. For example, data like {Album 04, 15, (Album 03, Album 05), Album_A, Artist _A, Cat 1} is generated and recorded. (Album 03, Album 05) means that album numbers of before and after the present album are 03 and 05. This data can be later changed to original data by manual input.

The present system includes two backups of this database file to reduce errors caused by the influence of an instantaneous power cut-off or the like. Namely, there are three database files keeping the same contents. Therefore, it is possible to recover the database by using database files for backup even when the main database file becomes unreadable due to some sort of cause.

These three database files, however, are also files which are recorded on the hard disk. Therefore, there sill be a concern that files may not be recorded properly due to power cut-off or the like during updating the main database file and/or backup files. The present embodiment solves this problem by adding flags indicating updating conditions to the database files.

FIG. 12 illustrates a directory structure of this invention. Here, the main database file is called the master DB (DB (SYS)), and the files for backup are called the backup 1 DB (DB (BU1)) and the backup 2 DB (DB (BU2)). Each DB file is recorded in a different directory. Here, for example, the master DB file is recorded in the system directory on the hard disk, the backup 1 DB file is recorded in the backup 1 directory, and the backup 2 DB file is recorded in the backup 2 directory. Audio data is structured in directories MUSIC 1-10, below which directories ALBUM 1-10 are formed. Directories T01-99 are formed further below, and tunes in one album are stored in these T directories.

FIG. 13 illustrates a structure of a data base file. In the header part of each DB file, a flag to indicate updating condition of the file is written. Namely, the flag will be "E" to indicate the file is being edited, "C" (a flag exclusive for the master DB) to indicate the file is being copied into a backup DB, and "F" to indicate the editing of the file is completed.

During system start-up, the following checking process is performed using these database files (see FIGS. 7-9). Namely, when the DB checking process begins, header information is read respectively from three DB files to check updating condition, because locations of DB files are known in advance as described above (Step S200). If updating flags of all the DB files are "F" in Step 200, it means that DB files are updated completely without any problem, so that the process proceeds to next Step S207 without doing anything.

On the other hand, in the case when not all the updating flags of the DB files are "F" in Step 200, if one DB file or two DB files have updating flags of "F" and other DB files or file has an updating flag other than "F", or if reading process is judged to be error, the other DB files or file is recovered based on the DB file whose updating flag is "F". Specifically, the recovery operation is to copy the file whose updating flag is "F" into other DB files. When a plurality of files have updating flags of "F", the backup 2 DB, the backup 1 DB and the master DB will be processed with priority in this order, as shown in the flowchart in FIG. 7. Namely, when not all the updating flags of the DB files are "F" in Step 200, the process proceeds to Step 201, in which whether the updating flag of the backup 2 DB is "F" or not is judged. If the flag is "F", the process proceeds to Step 204 in which contents of the backup 2 DB are written in the backup 1 DB, and contents of the backup 2 DB are written in the master DB. The process proceeds to Step 207.

On the other hand, when the updating flag of the backup 2 DB is not "F" in Step 201, the process proceeds to Step 202, in which whether the updating flag of the backup 1 DB is "F" or not is judged. If the flag is "F", contents of the backup 1 DB are written in the backup 2 DB, and contents of the backup 1 DB are written in the master DB. The process proceeds to Step 207.

On the other hand, when the updating flag of the backup 1 DB is not "F" in Step 202, the process proceeds to Step 203, in which whether the updating flag of the master DB is "F" or not is judged. If the flag is "F", contents of the master DB are written in the backup 2 DB and the backup 1 DB respectively. The process proceeds to Step 207. If the updating flag of the master DB is not "F" in Step 203, it is judged that error occurred.

The backup 2 DB, the backup 1 DB and the master DB are processed with priority in this order as described above, because DB files are updated in the inverse order of this when audio signals are recorded. The DB files are kept in appropriate conditions by the above described process.

Moreover, in this DB checking process, information to identify the file (or album) being formed/updated, for example the path name of the file (or other information to identify the file), is recorded in a header of a DB file. The process to delete the file (album) in the header of the DB file is performed (Steps 207-210).

In Step 207, each DB file expands to the SD-RAM 26. In following Step 208, whether there is any file to be deleted or not is judged, and if there is no file to be deleted, the process proceeds to Step 201. If there is any file to be deleted, the process proceeds to Step 209 in which designated track/album is deleted, and the process proceeds to Step 210. In Step 210, each DB file is opened, updated, and then closed. Thus the DB checking process ends.

With this process, files whose recordation may be incomplete or files concerning tunes/albums for which instructions that they should be cancelled are issued can be deleted.

In Step 207, each DB file is closed after being expanded to the SD-RAM 26.

In the audio recording (recording) process in Step 33, data which is MP3-encoded by the DSP 24 is recorded in the hard disk 21 as a file. This process is illustrated in FIG. 8 in detail.

When the audio recording (recording) process is commanded, a directory (current directory) in which an audio file is recorded is set in Step 211. The process proceeds to Step 212, in which "E" to indicate the file is being edited is written in the header of the master DB file and information to identify the location of the audio file being written is further written therein. The master DB file is closed (Step 212). Next, two backup files are opened sequentially, and information to identify the location of the audio file being written is written in the headers. The files are closed (Steps 213 and 214). The audio file is formed, and the recording continues in Step S215. By setting conditions of database files like this, a defective audio file (an interrupted file) can be deleted through the flow in FIG. 7, if any problem occurs in the recording condition during formation of the audio file and the operation is halted.

When the processing of one tune ends, the audio file is closed (Step 216). The process proceeds to Step 217 in which the updating header of the master DB file is changed to "C" to indicate the file is being copied (indicating that a database file for backup is in a condition to be updated), and information about the location of the edited file is cleared.

Next, the process proceeds to Step 218 in which the updating flag of the backup 1 DB file is changed to "E". After that, the process proceeds to Step 219 in which the DB file is updated. When the process is completed, the updating flag is returned to "F", and information about the location of the edited file is cleared in Step 220.

Next in Step 221, the updating flag of the backup 2 DB file is changed to "E" first. After that, the DB file is updated (same as the case of the backup 1), and then the updating flag is changed to "F". After the edited file information is cleared, the file is closed (Steps 222 and 223). Finally, the updating flag of the master DB file is changed to "F" and closed (Step 224), thereby completing recordation of one tune. Whether the audio recording ends or not is judged in Step 225. If it does not end, the process goes back to Step 212 to repeat the aforementioned operation. When the audio recording operation ends, this audio recording (recording) operation ends.

Backups of the database file are formed by Step 217 through Step 224. Furthermore, even when the process is halted during formation of backups due to power cut-off or the like, it is possible to prevent inconsistency between the database file and the audio data file through the flow in FIG. 7.

FIG. 9 is a flowchart illustrating the operation when an -instruction to halt the recording operation or notification of shutdown is issued during recording. If an instruction to halt or the like is issued (Step 240), the audio file being recorded is closed and deleted (Step 230). The process proceeds to Step 231. Then, the master DB file is opened and the flag to indicate the file condition is set to "F", as well as the information about the location of the file is cleared (Steps 231 and 232).

The master DB is closed, and the backup 1 DB file is opened with the flag to indicate the file condition set to "F", as well as the information about the location of the file is cleared (Steps 233 and 234). Subsequently, the backup 1 DB is closed and the backup 2 DB file is opened with the flag to indicate the file condition set to "F", as well as the information about the location of the file is cleared (Steps 235 and 236). The backup 2 DB is closed and the operation ends (Step 237). When these processes are totally completed, the flags of all the DB files are set to "F".

Because of the above-described processes, not all the updating flags are in the condition of "F", when an operation unexpectedly ends due to an instantaneous power cut-off or the like during the audio recording operation and so on. In the next system start-up, however, the DB files, the audio files and the like may be recovered to be in a consistent condition (in a condition without inconsistency) based on the condition of the updating flags.

FIG. 10 is a flowchart illustrating the writing process into a sector. In the above-described recording process, writing into a sector is basically implemented in a low level. In this writing process, it is firstly checked whether the contents to be written are a directory entry or not (step 80). In a process which called the process in FIG. 10, whether information about the directory is to be written or not has already been taken in. The judgment is based on this information. If the contents are not the directory entry in Step 80, the process proceeds to Step 82 and the data is directly written into the designated LBA.

If the contents are the directory entry, the process proceeds to Step 81 in which whether there is any effective current work sector or not is checked (already checked during system start-up, as described above) (Step 1). If there is the effective current work sector, the process proceeds to Step 86. If not, the process proceeds to Step 82.

In Step 86 and subsequent steps, the contents of the effective current work sector are cleared, and whether there is a writing error or not is checked in Step 86. The process proceeds to Step 88 if there is no error. If there is an error, the operation ends as a writing error. In Step 88, the directory entry is first written in a sector of an effective current work sector +1 and then information on the sector is written therein. The process proceeds to Step 89 and whether there is an error or not is checked. If there is no error, the process proceeds to Step 90. If there is an error, the operation ends as a writing error.

In Step 90, the number of mountings, the effective current work sector number, the LBA ready to be written and checksum are recorded in the effective current work sector. Checksum here is a value obtained by adding information about the effective current work sector without checksum and information about the sector of the effective current work sector +1 by the word unit and then by being bit inverted +1. This checksum is used for judging whether the contents of the effective current work sector +1 are cleared or not in the above-described process during mounting. Subsequently, whether there is an error or not is checked in Step 91 and if there is no error, the process proceeds to Step 92. If there is any error, the operation ends as a writing error.

Next in Step 92, data for backup is written in a sector at a location +16 distant from the LBA ready to be written. Thereafter, the process proceeds to Step 82. With this process, the same data is written in the designated LBA and in the LBA +16 distant from the designated LBA in the case of the directory entry. In other words, one cluster is divided into the front and the back halves (provided with 16 sectors, namely half of the cluster size, as the offset), and data about the directory entry is written in each of the halves. Here, contents of the directory entry are a file name, a file size, a beginning cluster number of the file and so on.

If the information to be written is about directory, namely the directory entry is a part of the sector in the cluster to be written, the information is first written in the sector of +16 offset (Step 92), and then written in the designated sector (Step 82). For this, if the information is recorded without error in the designated sector when the process shown in FIG. 10 is called, it is assured that the information is also recorded without error in the sector of +16 offset.

Additionally, with the process of dividing one cluster in half, namely by setting the offset value half the size of one cluster, the manageable number of files may be maximized by this modification. Although it is possible to write fourfold in the directory entry by setting the offset value +8 for example, the manageable number of files decreases by half compared to the case when the offset value is +16, even though the reliability improves.

After Step 82, whether the information to be written is the directory entry or not is checked again (Step 83), and if it is the directory entry, contents of the sector of the effective current work sector +1 are cleared. With this, an error can be detected by checksum if update of the directory entry is properly completed, and a recovery process of the directory entry is not performed during mounting (see the flowchart of FIG. 5 and the description thereof).

The effectiveness of this operation can be confirmed by following read operation from the sector. FIG. 11 shows read operation from the sector. Data is read from the designated sector in this read operation where the LBA is designated. If there is no read error, read operation is completed (Step 76). If there is an error, the process proceeds to Step 77, in which whether contents of the directory entry are read or not is judged (Step 77). Basically, in the process which calls the sector reading process, whether the directory entry is to be read or not is decided. Therefore, this information is used in Step 75. If it is not the directory entry, the process ends with error. If it is the directory entry, the process proceeds to Step 78, wherein data is read from the sector of the designated LBA +16 in order to be used as information about the directory entry. In other words, regarding the directory entry, same information is doubly recorded in one cluster, which is highly redundant and resistant to errors. Therefore, it is highly effective for application to audio signal recording/reproduction devices for on-vehicle use and the like.

Although above descriptions are made on recording/reproduction devices using hard disks, this invention can be applicable to devices using semiconductor memories as recording media.

INDUSTRIAL APPLICABILITY

This invention is applicable to devices using hard disks as recording media, such as on-vehicle audio signal recording/reproduction devices, portable audio signal recording/reproduction devices, PDA (Personal Digital Assistant) and laptop personal computers.

DESCRIPTION OF REFERENCE NUMERALS

Figure 1:
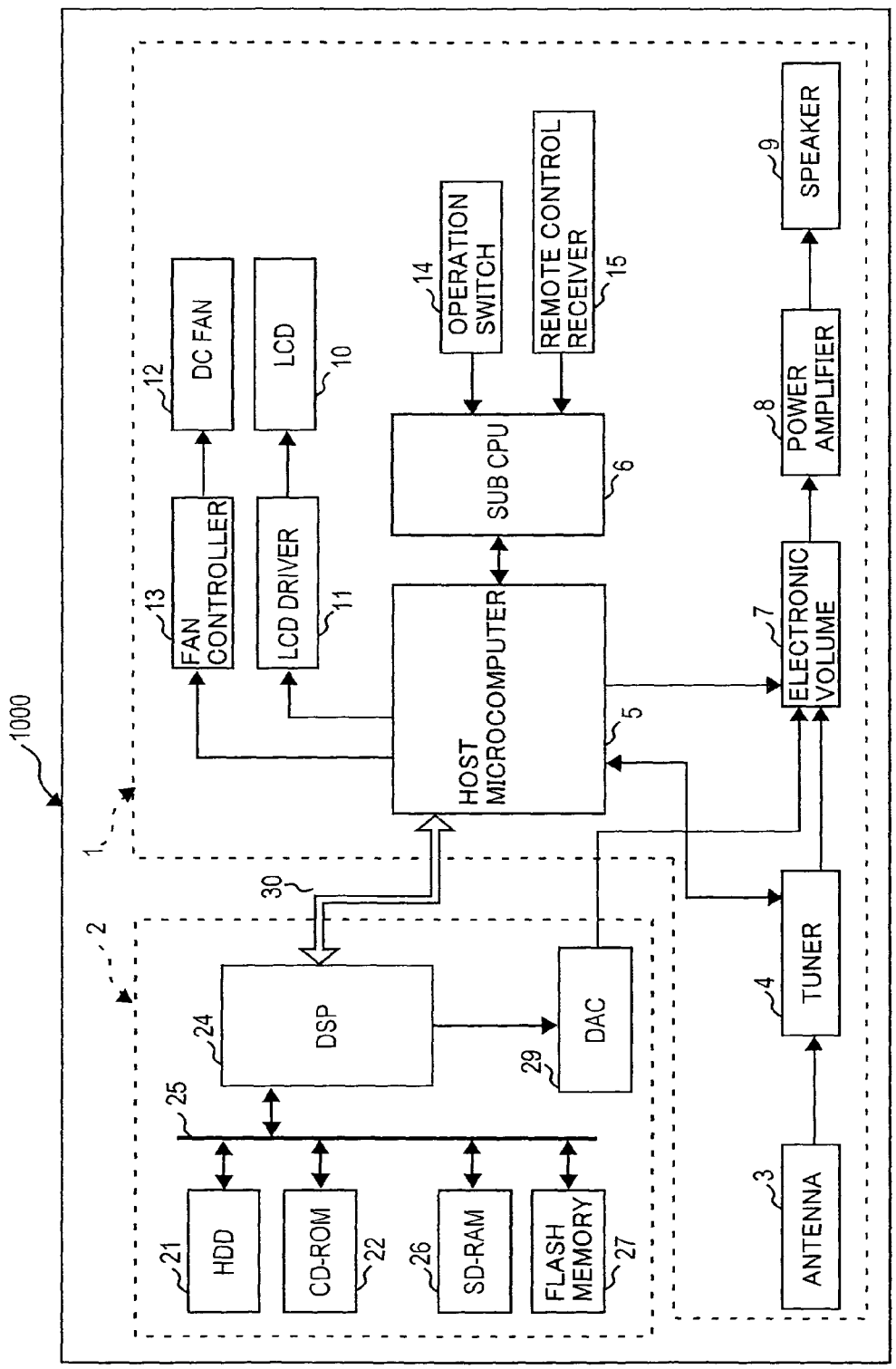
FIG. 1 is a block diagram illustrating the embodiment of this invention.
Figure 2:
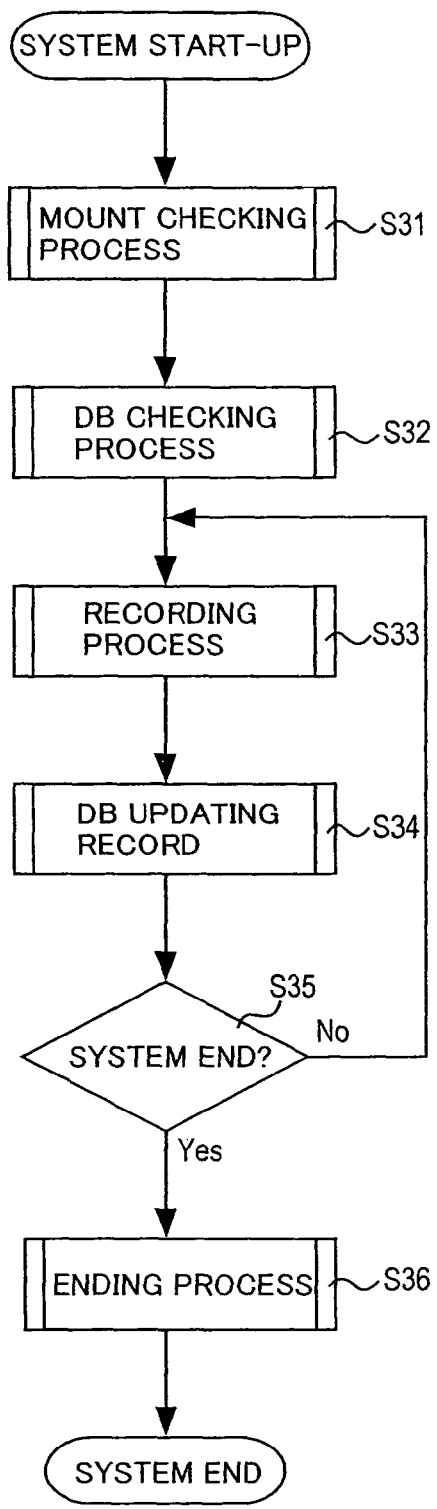
FIG. 2 is a flowchart illustrating the outline of operations according to the embodiment of this invention.
Figure 3:
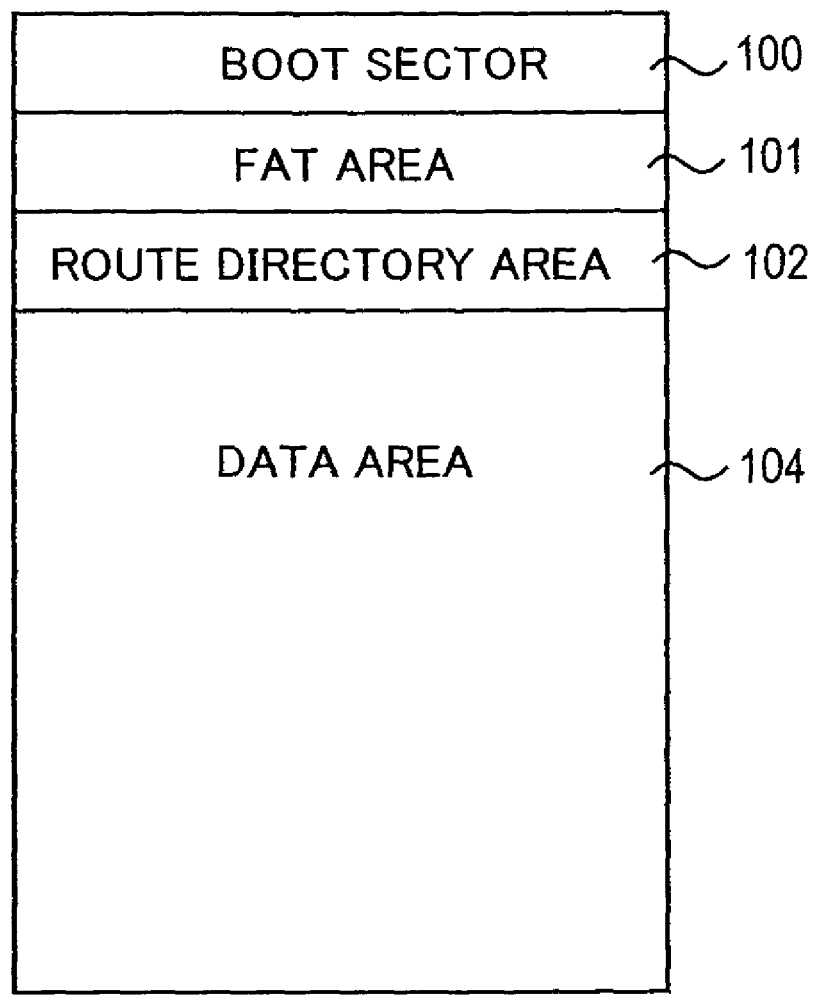
FIG. 3 is a configuration drawing illustrating areas in a hard disk according to this invention.
Figure 4:
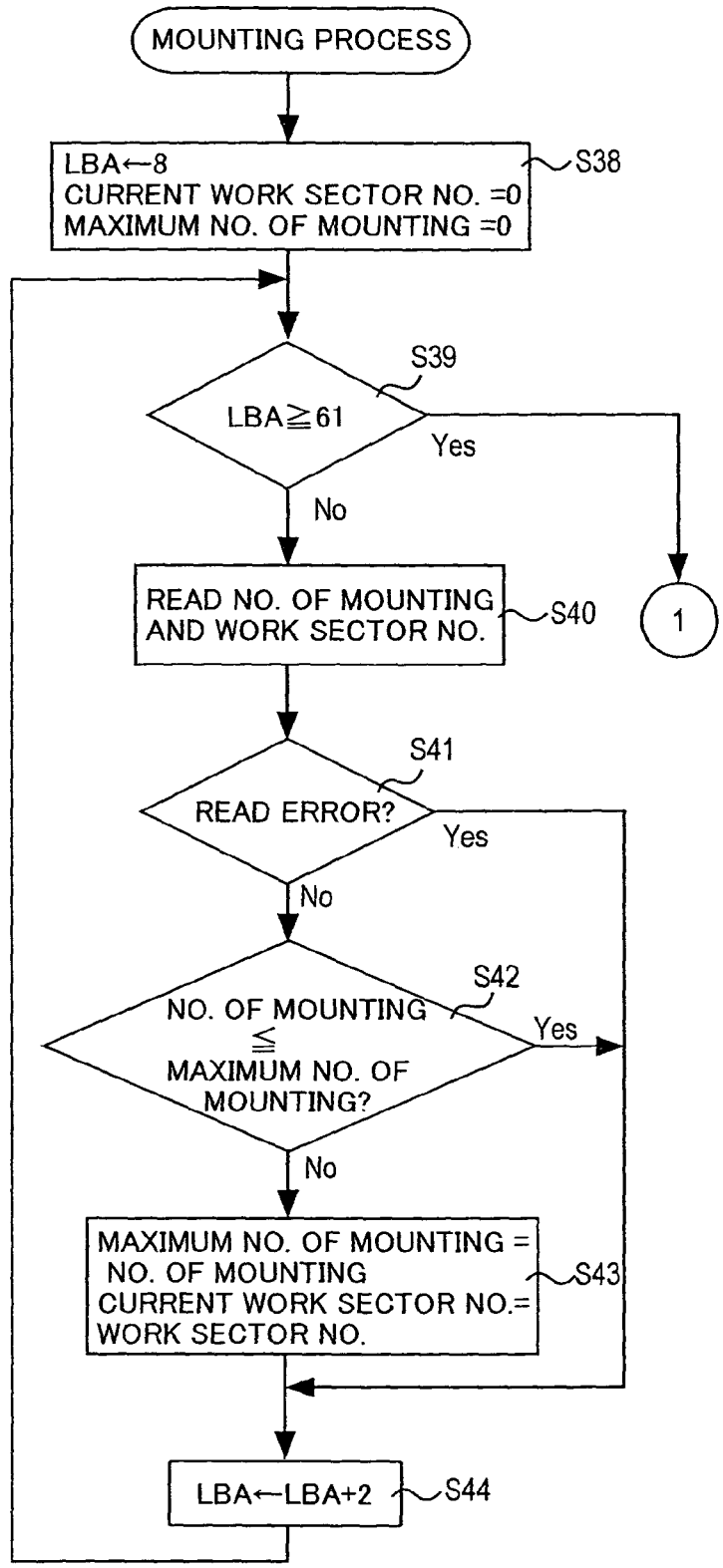
FIG. 4 is a flowchart illustrating a part of the operation in mounting process according to the embodiment of this invention.
Figure 5:
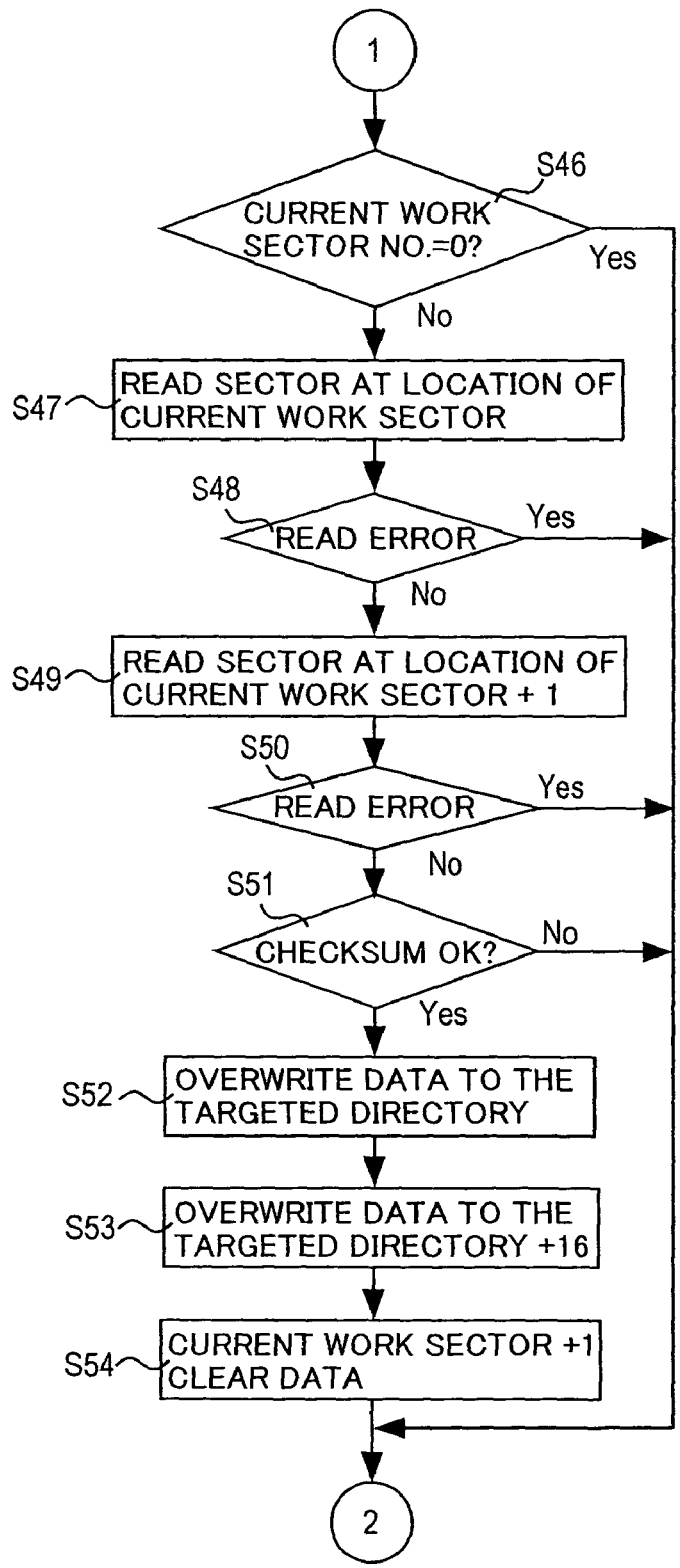
FIG. 5 is a flowchart illustrating a part of the operation in mounting process according to the embodiment of this invention.
Figure 6:
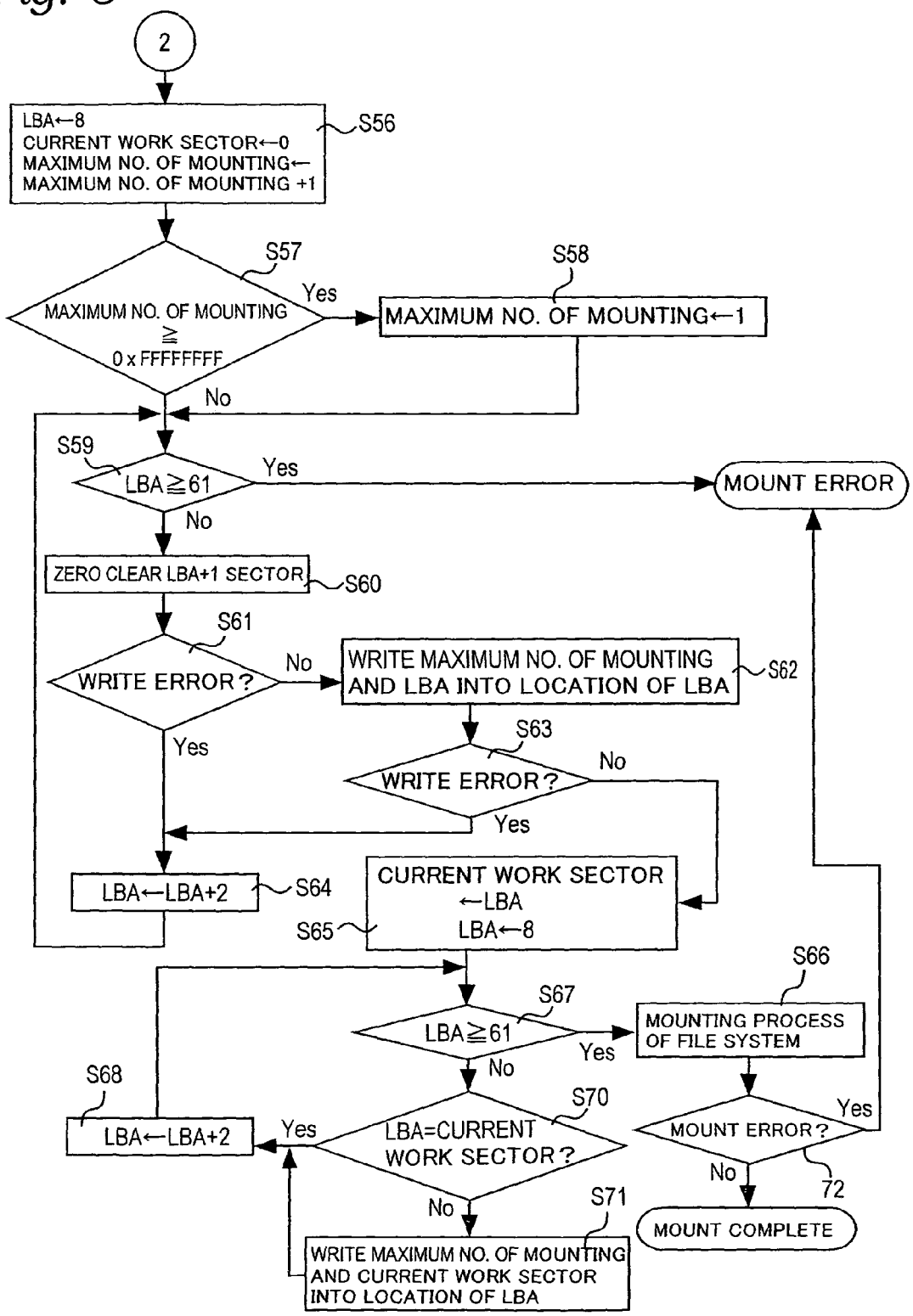
FIG. 6 is a flowchart illustrating a part of the operation in mounting process according to the embodiment of this invention.
Figure 7:
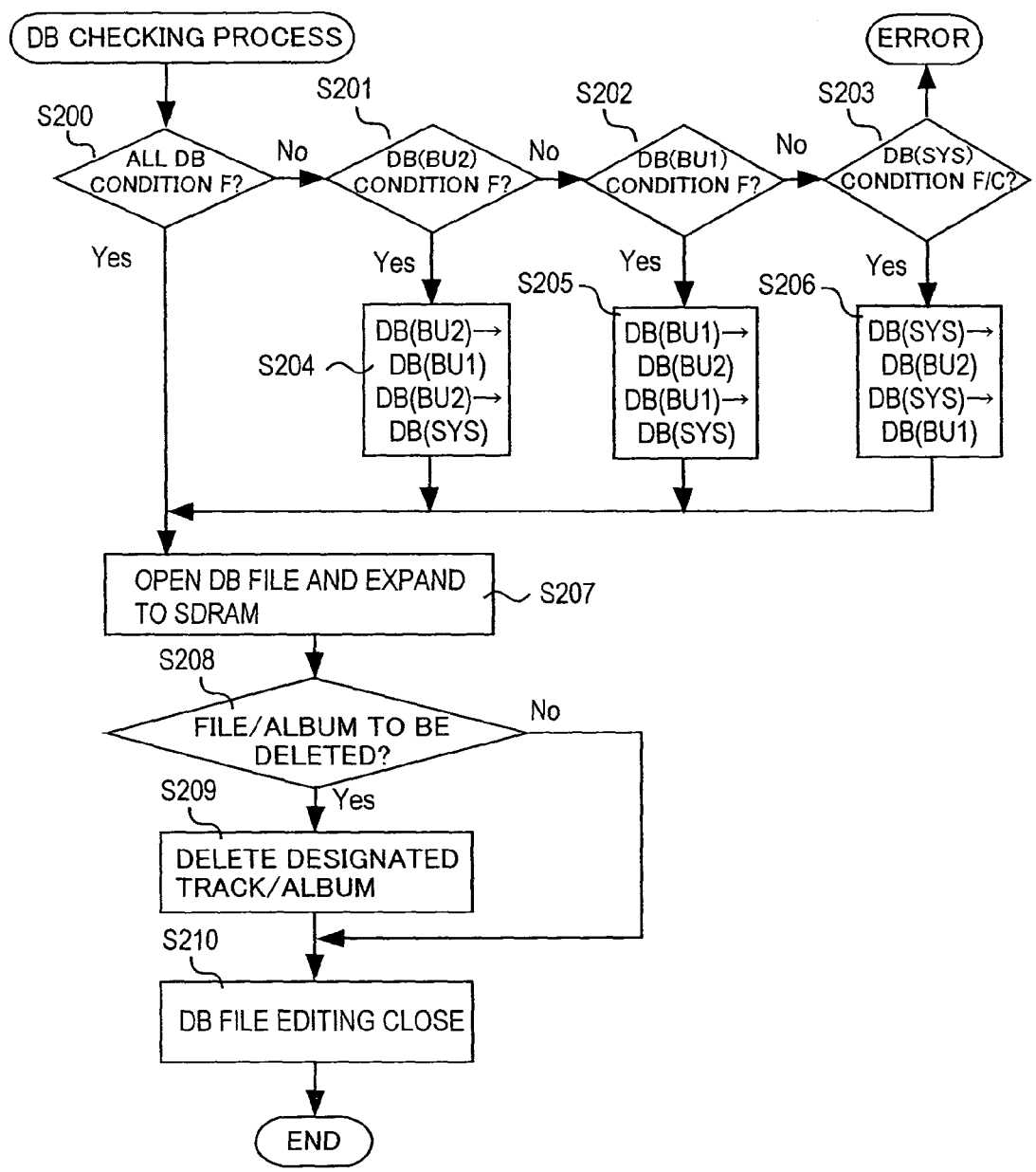
FIG. 7 is a flowchart illustrating the database file checking process according to the embodiment of this invention.
Figure 8:
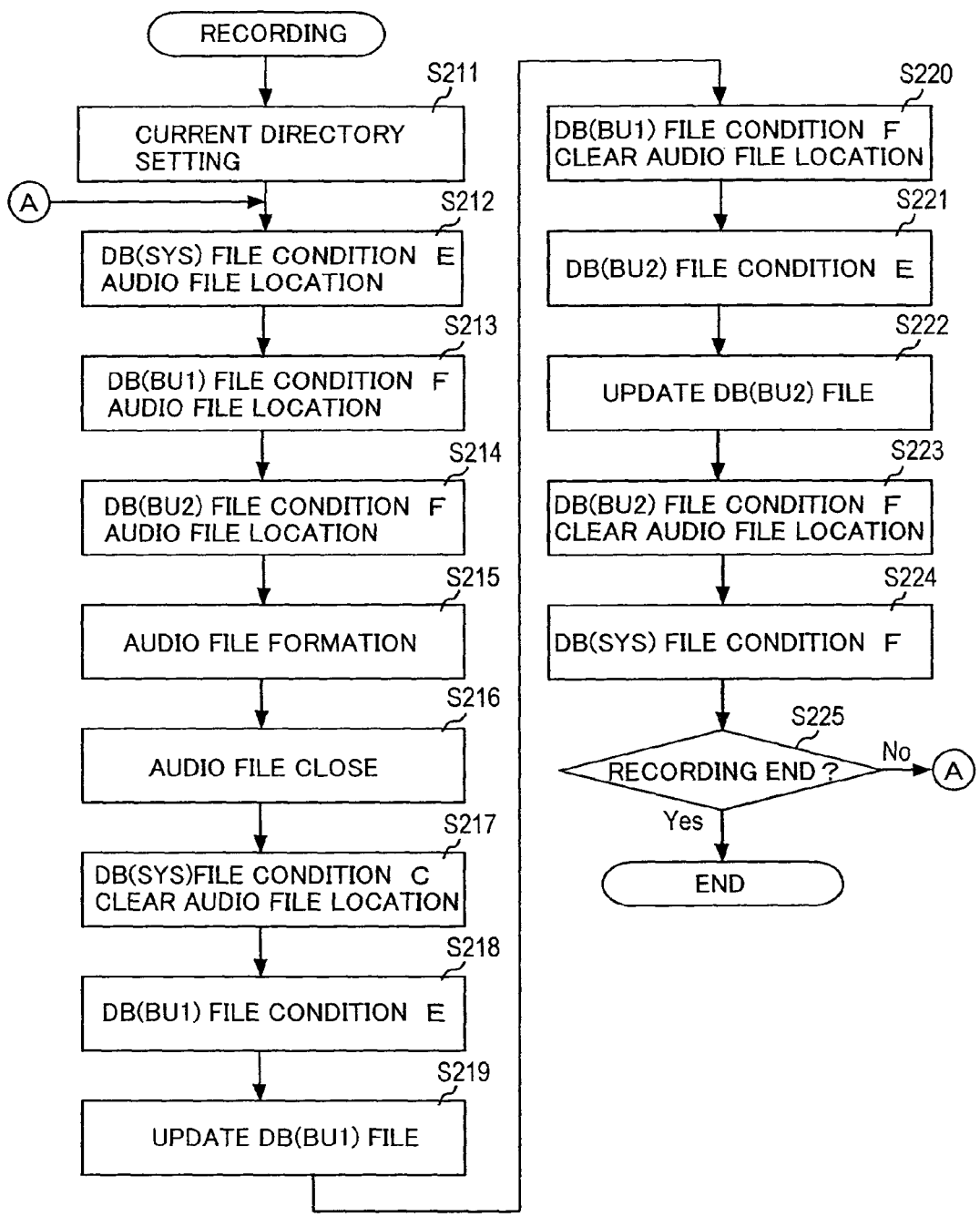
FIG. 8 is a flowchart illustrating the database file processing in the recording operation according to the embodiment of this invention.
Figure 9:
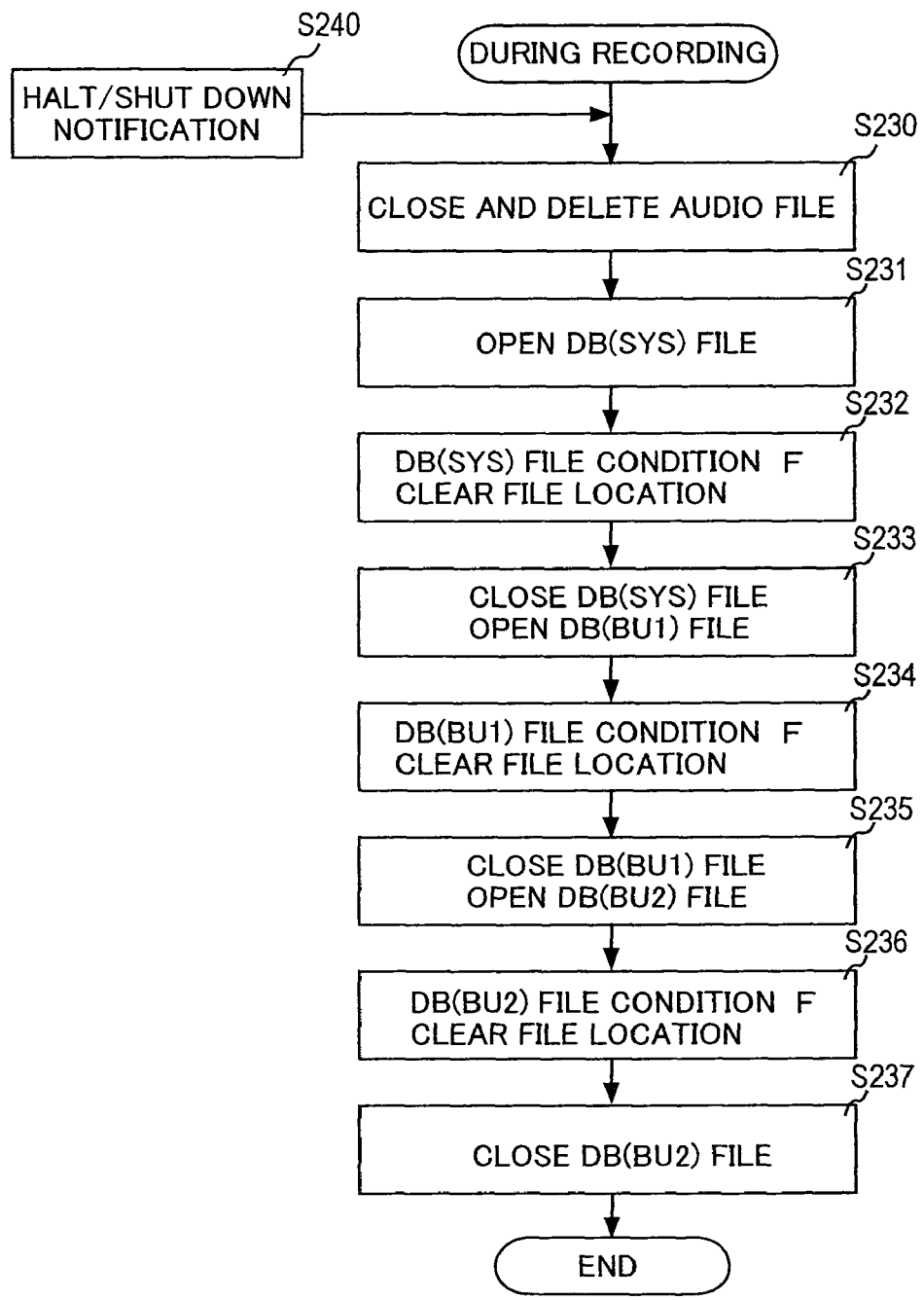
FIG. 9 is a flowchart illustrating another database file processing according to the embodiment of this invention.
Figure 10:
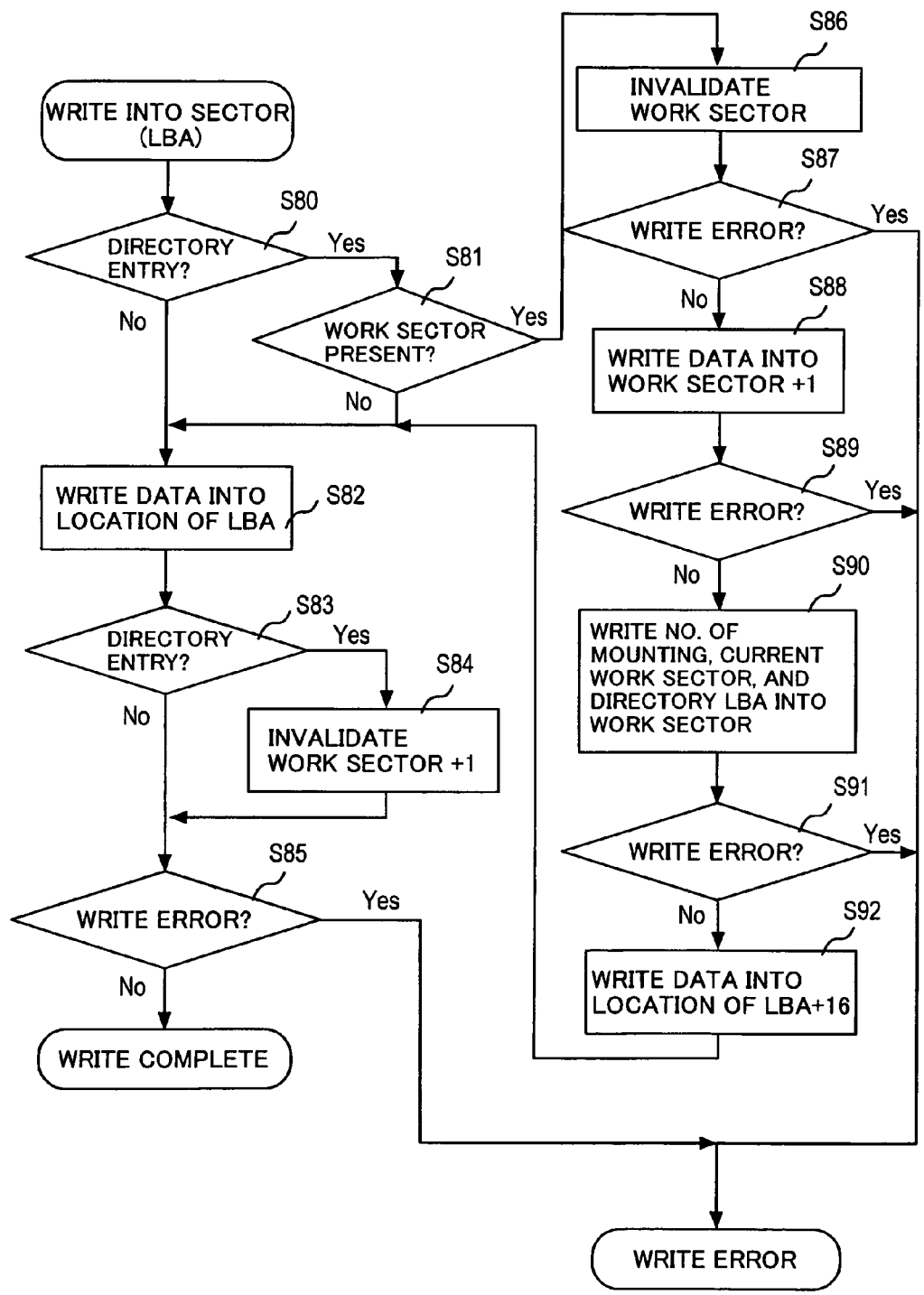
FIG. 10 is a flowchart illustrating the writing process into the sector according to the embodiment of this invention.
Figure 11:
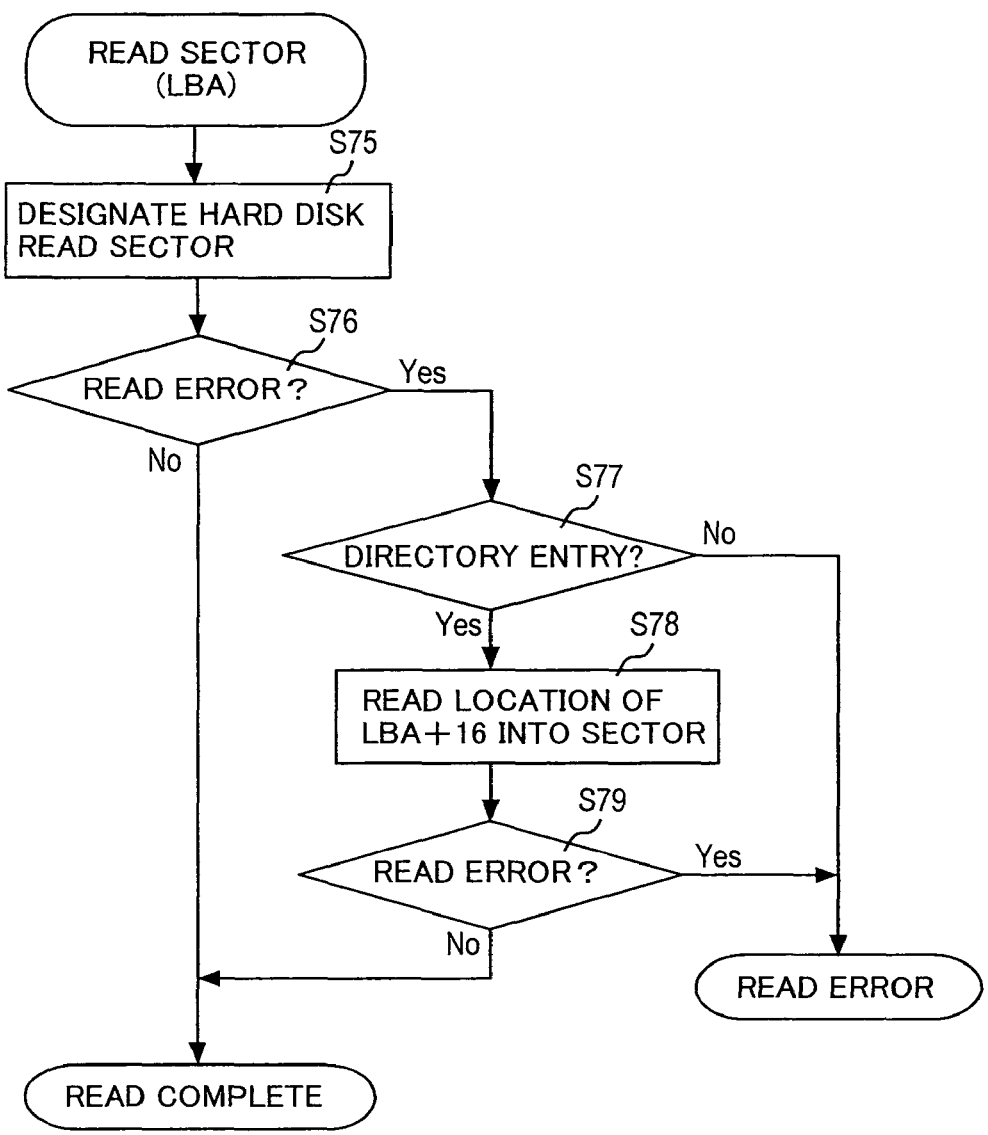
FIG. 11 is a flowchart illustrating the sector reading process according to the embodiment of this invention.
Figures 12, 13:
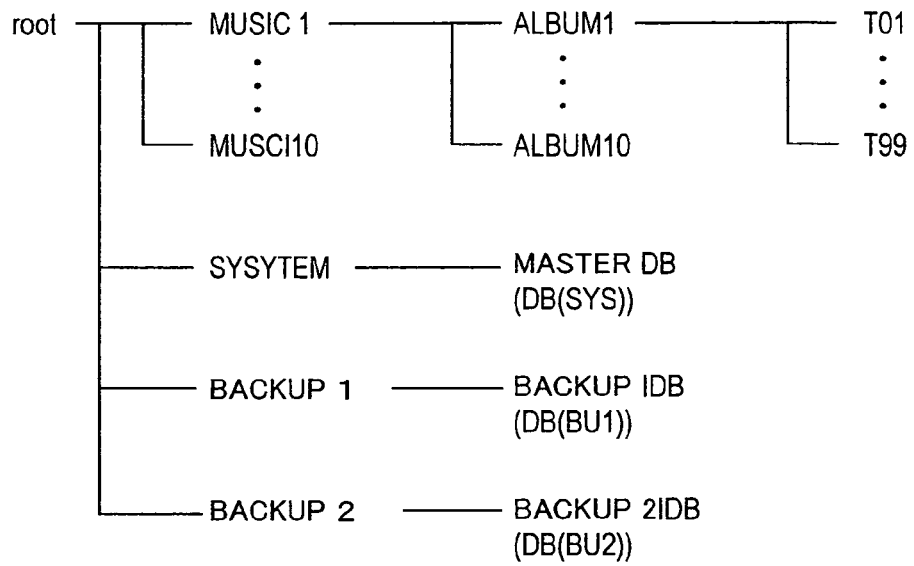
FIG. 12 is a configuration drawing illustrating the directory according to this invention.
FIG. 13 is a configuration drawing illustrating the data file according to this invention.

1 main unit
2 digital processing unit
5 host microcomputer
21 hard disk
22 CD-ROM
24 DSP
29 DAC
26 SD-RAM
27 flash memory

What we claim is:

1. An information recording method using a file system managing files hierarchically by the files having information and a directory which is a storage place of the files, wherein the file system writes the information in and reads the information from a recording medium per cluster, comprising:

recording a predetermined information about a directory entry including an address of a target sector area and a data of the directory entry, using a processor, in a work sector area for a backup purpose before performing primary recording of the data of the directory entry to the target sector area, wherein the work sector area is a part of a boot sector; and recording the number of mountings of the file system, using the processor, in the work sector area, wherein upon completion of writing of the data in the target sector area, the work sector area will be cleared.

2. The information recording method according to claim 1, wherein the work sector area comprises a plurality of sectors, and wherein the number of mountings is recorded in one sector of the work sector area, and the data of the directory entry is recorded in another sector of the work sector area.

3. The information recording method according to claim 2, wherein the work sector area is determined when the file system is mounted.

4. The information recording method according to claim 1, wherein the file system is a FAT file system.

5. A device for recording and/or reproducing information, wherein the information recording method according to any one of claims 1, 2, 3 or 4 is used.

6. An information recording method using a file system managing files hierarchically by the files having information and a directory which is a storage place of the files, wherein the file system writes the information in and reads the information from a recording medium per cluster, comprising:

writing a first data of a first directory entry, using a processor, in a cluster; and writing a backup data of the first directory entry, using a processor, in the cluster such that the first data and the backup data written in the cluster are separated from each other by a predetermined offset, wherein the backup data includes an entire content of the first directory entry, and wherein the predetermined offset is half size of the cluster.

7. The information recording method according to claim 6, wherein the file system is a FAT file system.

8. The information recording method according to claim 6, wherein the first data and the backup data are written in the cluster of a work sector.

9. A device for recording and/or reproducing information, wherein the information recording method according to any one of claims 6, 7 or 8 is used.

* * * * *